(12) United States Patent
Onal et al.

(10) Patent No.: US 11,865,702 B2
(45) Date of Patent: Jan. 9, 2024

(54) ROBOTIC GRIPPER MEMBER

(71) Applicant: Worcester Polytechnic Institute, Worcester, MA (US)

(72) Inventors: Cagdas D. Onal, Natick, MA (US); Onder Ondemir, Natick, MA (US); Weijia Tao, Natick, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 153 days.

(21) Appl. No.: 17/410,719

(22) Filed: Aug. 24, 2021

(65) Prior Publication Data
US 2022/0040868 A1   Feb. 10, 2022

Related U.S. Application Data

(63) Continuation-in-part of application No. 16/176,138, filed on Oct. 31, 2018, now Pat. No. 11,097,430.
(Continued)

(51) Int. Cl.
*B25J 15/10* (2006.01)
*B25J 15/12* (2006.01)
(Continued)

(52) U.S. Cl.
CPC ............. *B25J 15/12* (2013.01); *B25J 9/0015* (2013.01); *B25J 9/104* (2013.01); *B25J 9/1075* (2013.01); *B25J 15/10* (2013.01)

(58) Field of Classification Search
CPC . B25J 15/12; B25J 15/10; B25J 9/0015; B25J 9/1075; B25J 9/104
(Continued)

(56) References Cited

U.S. PATENT DOCUMENTS

| 4,685,929 A | 8/1987 | Monestier |
| 5,251,538 A * | 10/1993 | Smith ..................... F16J 3/06 92/92 |

(Continued)

FOREIGN PATENT DOCUMENTS

| SU | 1299676 A1 | 3/1987 |
| SU | 1450995 A1 | 1/1989 |

OTHER PUBLICATIONS

International Search Report, PCT/US2018/058378, pp. 2, dated Feb. 14, 2019.

*Primary Examiner* — Paul T Chin
(74) *Attorney, Agent, or Firm* — Armis IP Law, LLC

(57) ABSTRACT

A soft bodied robotic member has the appearance of a finger and has a deformable rubber elongated body surrounding an array of rigid ribs interconnected by a perpendicular constraint. The plates form a series of parallel protrusions extending from opposed sides of the body and have a serrated, sawtooth or wavelike appearance. A tether runs through each row of protrusions and draws the corresponding protrusions together in a compressive manner to bend or dispose the finger toward the compressed side. Gaps between the protrusion allow movement of the protrusion towards adjacent protrusions to dispose the body in an arcuate shape. The constraint is a planar sheet that bends with the arc along its width, but resists lateral twisting, thus limiting movement outside a plane defined by the arc and the tether. Multiple finger members may be placed in close geometric proximity for gripping a common object.

16 Claims, 15 Drawing Sheets

Related U.S. Application Data

(60) Provisional application No. 62/579,213, filed on Oct. 31, 2017.

(51) Int. Cl.
*B25J 9/10* (2006.01)
*B25J 9/00* (2006.01)

(58) Field of Classification Search
USPC .................................. 294/99.1; 74/490.04
See application file for complete search history.

(56) References Cited

U.S. PATENT DOCUMENTS

| | | | |
|---|---|---|---|
| 5,297,443 A | 3/1994 | Wentz | |
| 5,317,952 A | 6/1994 | Immega | |
| 7,678,117 B2 | 3/2010 | Hinman et al. | |
| 8,065,920 B2 * | 11/2011 | Park | B25J 13/085 |
| | | | 73/860 |
| 9,492,930 B2 * | 11/2016 | Galloway | B25J 15/12 |
| 2004/0236316 A1 | 11/2004 | Danitz et al. | |
| 2005/0107667 A1 | 5/2005 | Danitz et al. | |
| 2009/0314119 A1 | 12/2009 | Knoll | |
| 2013/0090763 A1 | 4/2013 | Simaan et al. | |
| 2013/0312564 A1 | 11/2013 | Kim et al. | |
| 2014/0260755 A1 | 9/2014 | Dong et al. | |
| 2017/0014998 A1 | 1/2017 | Langenfeld et al. | |
| 2019/0015978 A1 * | 1/2019 | Takagi | B25J 9/0015 |
| 2020/0189095 A1 | 6/2020 | Manfredi | |

* cited by examiner

ROBOTIC GRIPPER MEMBER

RELATED APPLICATIONS

This patent application is a Continuation-In-Part (CIP) of U.S. patent application Ser. No. 16/176,138, now U.S. Pat. No. 11,097,430, which claims the benefit under 35 U.S.C. § 119(e) of U.S. Provisional Patent App. No. 62/579,213, filed Oct. 31, 2017, entitled "RESILIENT ROBOTIC GRIPPER MEMBER," incorporated herein by reference in entirety.

BACKGROUND

Robotics are continually becoming more integrated into manual tasks previously performed by human actions such as grasping and holding objects. Robotic elements are typically constructed of rigid materials to provide sufficient strength and structural integrity. Control algorithms for providing precise feedback and tactile sense operations are often employed to provide a fine degree of control for engaging an object.

SUMMARY

A soft bodied robotic member has the appearance of a finger and has a deformable rubber or silicone elongated body surrounding an array of rigid ribs or plates interconnected by a constraint running perpendicular to each of the plates. The plates form a series of parallel protrusions extending from opposed sides of the body and have a serrated, sawtooth or wavelike appearance. A tether runs through each row of protrusions and draws the corresponding protrusions together in a compressive manner to bend or dispose the finger toward the compressed side. Gaps between the protrusion allow movement of the protrusion towards adjacent protrusions to dispose the elongated body in an arcuate shape. The constraint is a planar sheet of PET or similar material that bends with the arc along its width, but resists lateral twisting, thus limiting movement outside a plane defined by the arc and the tether.

Finely tuned control algorithms coupled with precise manufacturing and narrow tolerances for actuated members are required in conventional robotic systems to simulate fine motor activities such as grasping and manipulating objects. Configurations herein are based, in part, on the observation that robotic control instructions may require substantial computational resources for computing a timely response to a simulated touch or grasp. Unfortunately, conventional approaches suffer from the shortcoming that rigid elements often used for conventional robotic members encounter shortcomings of touch and sensitivity, typically when performing actions that simulate human fine motor activity. These conventional approaches require finely tuned mechanical structures and precise control algorithms for engagement of surfaces and objects to provide a robotic sense of contact or engagement with a grasped, pushed or held object.

These conventional approaches for sensing deformations and stresses relies on strain measurements of a sensing element. When directing a robotic member to grasp an object, a narrow range of grasping force and movement is needed to avoid dropping or crushing the grasped object. Fiber optic systems provide advanced accuracy and dynamic response, but require bulky signal conditioning units, making it difficult to integrate in a compact embedded package. Strain gauges are typically resistive, subject to drift and other dynamic artifacts, due to material response. Another strain-based resistive sensing approach uses liquid metals in embedded fluidic channels, relying on the change in channel dimensions under material strain.

Configurations herein substantially overcome the shortcomings of conventional rigid material robotic members by providing a resilient, deformable robotic member responsive to deformation and curvature based on retraction of a tether or cable along a side of the robotic member. Multiple tethers along a plurality of sides of the robotic member provide for varied retraction of the tethers to result in deformation or curvature towards the side of greatest retraction. The elongated body therefore defines a robotic finger curvably deformable for grasping an object based on controlled retraction of the tethers.

Each finger therefore compresses on one side responsive to retraction of the tether to move the finger in a curved manner toward an object. A plurality of fingers arranged to converge on an object provides a multi point grip from compression of the resilient, deformable material. In contrast to conventional robotic gripping, which employs hard surfaces or members and precise compression feedback for regulating gripping force, the resilient material deforms in contact with an object to avoid crushing or breakage.

In a basic configuration, the robotic finger includes an elongated body defining an axis, such that the body is formed from a resilient medium or material and has a proximate end and a distal end. At an unactuated or rest position, the finger member extends generally straight along the axis. A plurality of optional protrusions on the body extend from the axis, and an actuated tether adjacent the elongated body is attached to the distal end, such that the tether is responsive to retraction for disposing the distal end out of axial alignment based on compression along a side of the body, thus curving the straight member for extending around and grasping an object. Multiple fingers may be employed around a common object.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is an example configuration of the robotic member. The example robotic member is defined by a body of a resilient medium such as rubber, silicone or elastomer, and an inner skeleton or frame including an array of parallel plates interconnected by a flexible strip or constraint adapted to limit bending or deformation within a single plane.

Figure 1:
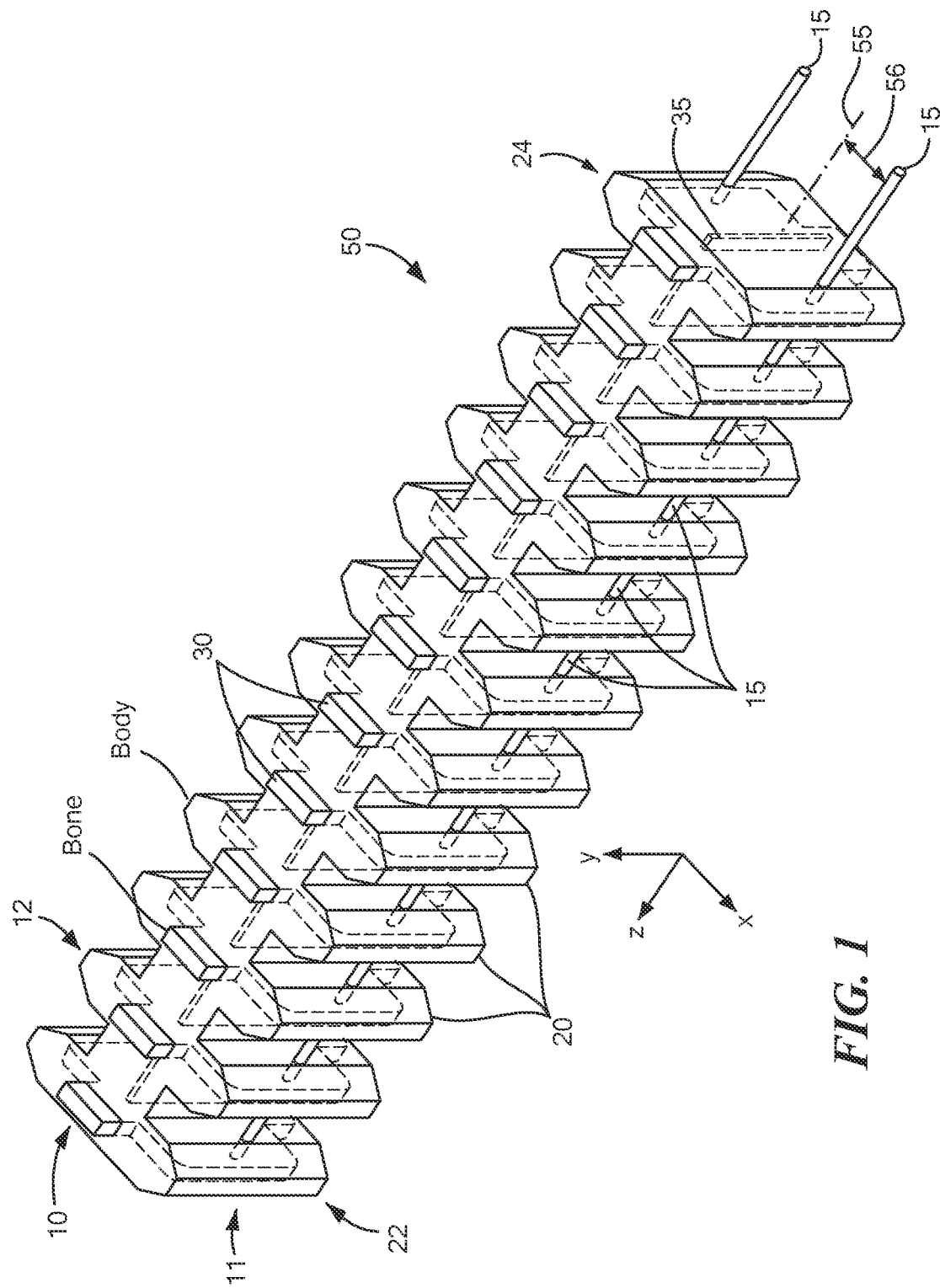
FIG. 1 is a perspective view of a robotic finger members as disclosed herein.

FIG. 1 is a perspective view of a robotic finger member as disclosed herein. The finger member 50 includes an elongated body 10 defining a robotic control axis 55 extending lengthwise along the body 10, and a plurality of protrusions 20, appearing as fins or teeth, attached to a side of the body 10, such that the protrusions 20 extend substantially perpendicular to the axis and substantially parallel to each of the other protrusion 20. Control tethers 15 extend parallel to the control axis and are attached to an actuation source at a proximate end 24, and an aperture in each of the protrusions 20 is adapted to receive the tether 15 from an adjacent protrusion along the side of the body. The tether is secured to a distal end 22 of the elongated body 10 at an offset 56 such that the tether 15 is adapted to deform the elongated body and draw the protrusions into closer engagement upon retraction of the tether by an actuation source such as a motor or pulley that compresses the body 10 along the retracting tether 15. A common tether may also simply "loop" around at the distal end 22 and pass back on the opposed side.

In a typical configuration as in FIG. 1, the finger member 50 employs a row of protrusions 20 along each of an opposed side 11, 12 of the elongated body 10, such that each row of protrusions is responsive to a respective control tether 15 for retracting and deforming the elongated body 10 by drawing the protrusions in the row of protrusions into closer engagement for curvature in respective directions. Multiple rows of protrusions may be provided to allow greater degrees of freedom. Each of the rows of protrusions has a corresponding control tether 15, such that each of the plurality of control tethers is adapted to retract for compressing fins on the side 11, 12 through which the control tether passes. A solid body 10 may also be defined that relies on compression alone based on the tethered attachment at an offset 56 that causes unequal compression along the body 10. The offset defines attachment of the tether distal from the axis 55 that results in focusing the compression along a side 11, 12. The body 10 may include rigid plates 30 attached or encapsulated in each of the protrusions, and a central constraint 35 perpendicular to the plates 30 and extending along the length of the body 10. The rigid plates 30 are adapted to resist compression resulting from tether retraction for causing the retracted member to deform toward the side (direction) of the retracted tether, rather than compressing the body toward the proximate end from tether retraction. The constraint 35 resists twisting out of plane, discussed below. A plurality of elongated bodies may be used to define a finger arrangement for deforming toward a common object for a robotic grasp.

The protrusions 20 typically appear as rows of protrusions defined by parallel ridges extending perpendicularly from opposed sides 11, 12 of the body. The protrusions 20 generally have a tapered cross section extending from a base to a ridge, the base attached to the body 10 and the ridge perpendicular to the axis 55.

FIG. 1 depicts the assembled and formed finger member with the plates 30, constraint 35 and tethers 15 embedded in the finger member 50. FIGS. 2A and 2B are schematic side views of an undeformed and actuated finger member frames. Referring to FIGS. 1 and 2A-2C, the plates 30 and constraint 35 define a semi-flexible frame 40. The plates 30 are a rigid material such as acrylic, and the constraint 35 is a semi rigid sheet material such as polyethylene terephthalate (PET) that is flexible but retaining an inherent stiffness. In alternate configurations, a constraint of varying 3-dimensional construction may be employed, such that the constraint has a greater rigidity than the resilient medium in at least one dimension. At a rest position, the frame 35 defines an axis 55 and skeleton-like structure with a "spine" defined by the constraint 35 and the plates 30 defining perpendicular "bones." The constraint 35 extends through slots in the plates 30, and will be held in place by the molded resilient material, discussed further below.

Figure 2C:
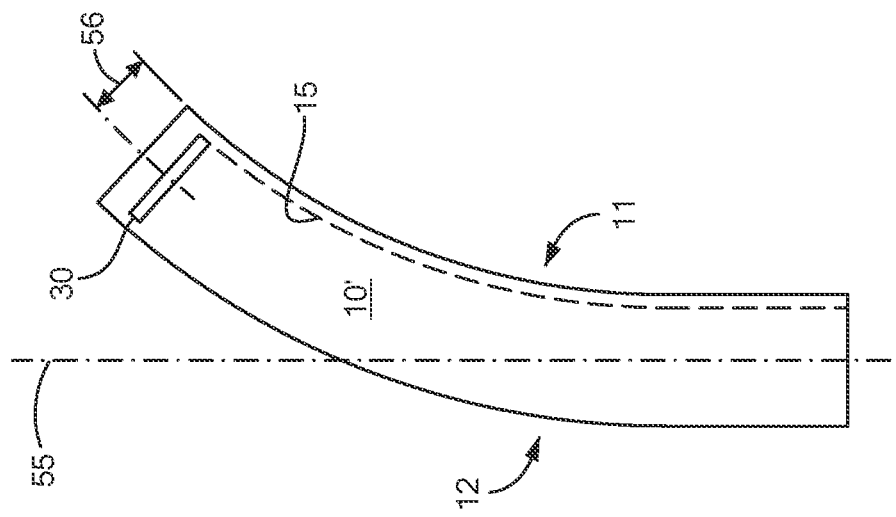
FIGS. 2A-2C are schematic views of an undeformed and actuated finger members.
Figure 2B:
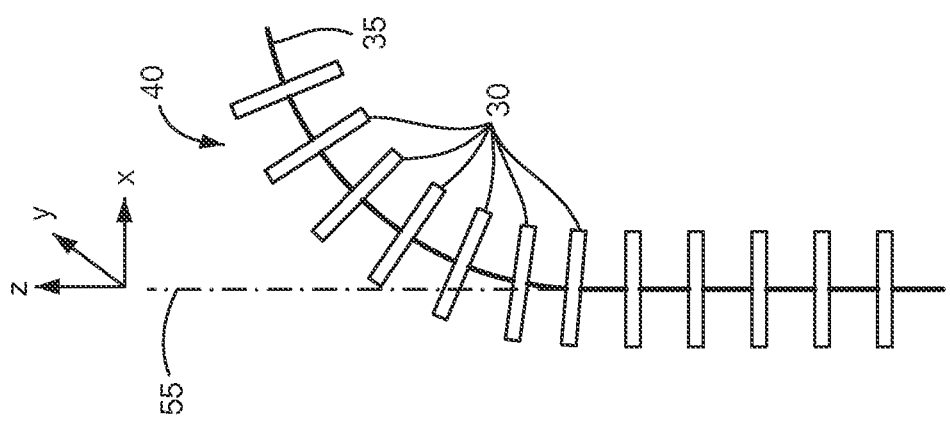
Figure 2A:
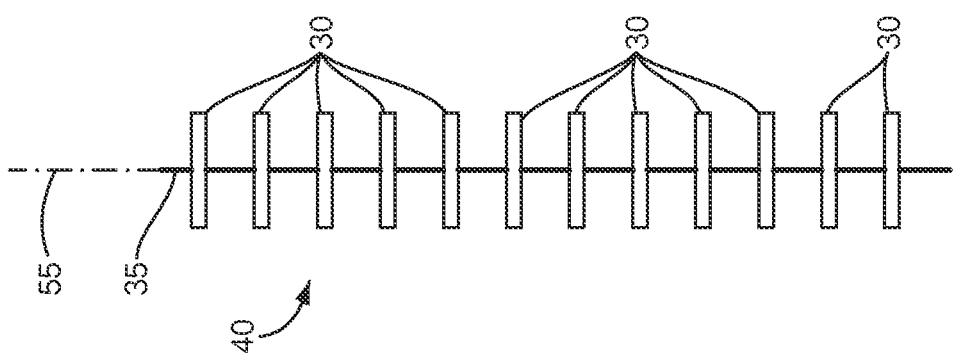

FIG. 2C illustrates the offset 56 of the tether 15 that results in unequal compression of the resilient material of the body 10. In FIG. 2C, a smooth or linear sided body 10' undergoes compression on the side 11 resulting from retraction of the tether 15 at an offset 56. At least one plate 30 engages the tether for defining the offset 56 and allowing compression along the tethered side for drawing the body off the axis 55. While protrusions 30 enhance stability and tend to define a hinge for curved response, compression of the resilient material of the body 10 generates a curved response in the direction of the compressed side 11.

At rest, that is, when the tethers 15 are relaxed, the plates 30 are aligned in parallel, generally equidistant from adjacent plates 30, and perpendicular to the constraint. Upon tether 15 actuation, one side 11, 12 compresses such that the plates 30 are drawn closer together causing the constraint 35 to bend away from the axis 55 (corresponding to the Z axis in FIG. 1). A width of the constraint 35 causes the plates 30 to remain in the plane defined by the Z and X axes.

Figure 3B:
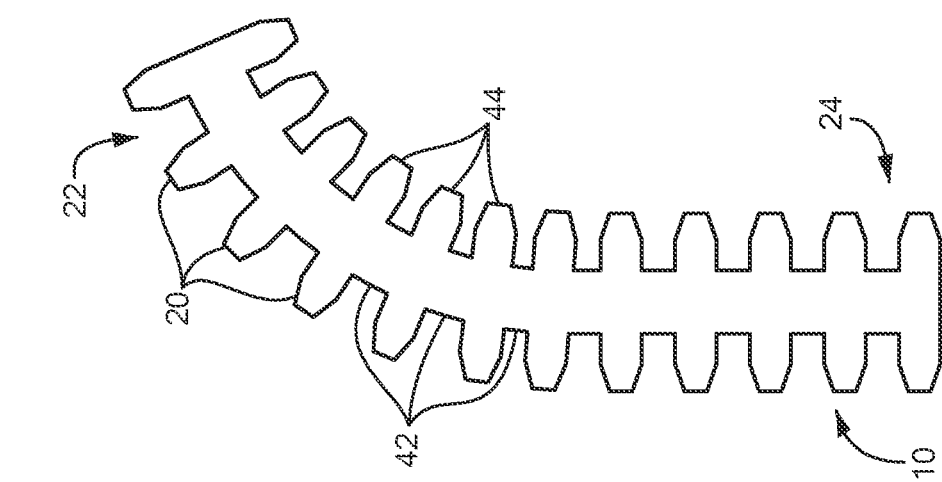
FIGS. 3A and 3B are side views of the undeformed and actuated (deformed) finger members of FIGS. 2A and 2B.
Figure 3A:
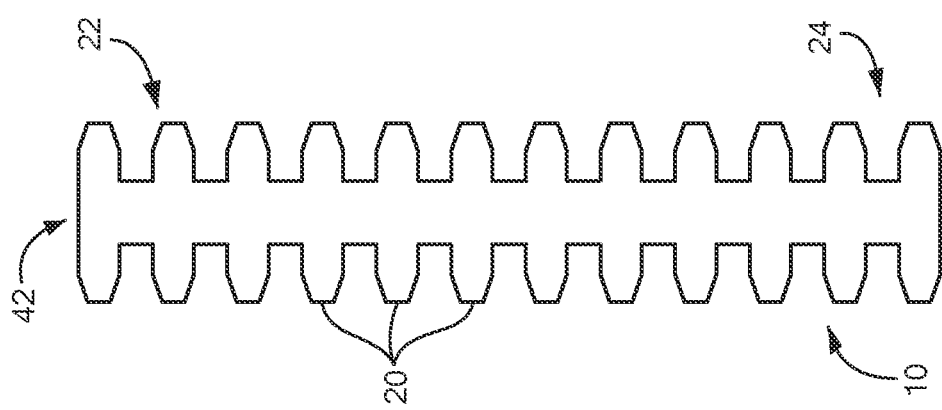

FIGS. 3A and 3B are side views of the undeformed and actuated (deformed) finger members of FIGS. 2A and 2B after the frame is embedded in the resilient medium, the process of which is discussed further below. The resilient medium is adapted to deform for accommodating movement of adjacent protrusions responsive to tethered retraction. The body 10 is formed from a deformable material such as a silicon, rubber or elastomer material and is adapted for compressive deformation at a base 42 of the protrusions for drawing the ridges 44 of the protrusions closer for disposing the distal end 22 in a direction defined by the retracting actuator. The protrusions 20 extend from the body 10 at spaced increments that define a gap between adjacent protrusions 20.

Figure 4:
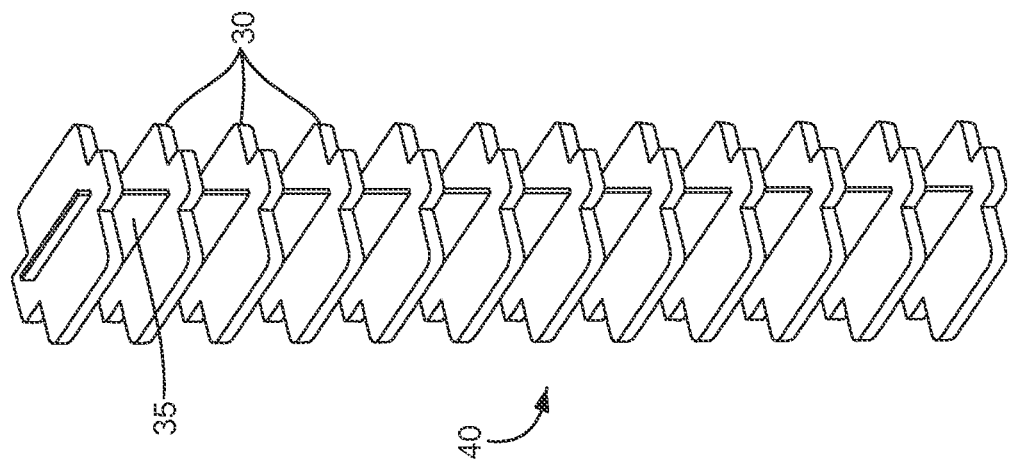
FIG. 4 shows a perspective view of the frame of FIGS. 2A and 2B.

FIG. 4 shows a perspective view of the frame of FIGS. 2A and 2B. Referring to FIGS. 2A, 2B and 4, the constraint 35 is in a perpendicular relation to the plates 30. The constraint 35 may interconnect with the plates 30 by any suitable manner for defining the frame 40, such as by slots in the constraint 35. The constraint 35 and plates 30 need not be of equal width, and will tend to align the frame 40 to avoid twisting. The planar constraint 35 extends parallel to the axis 55 and perpendicular to the protrusions 20, such that the constraint 35 is adapted to deform from a concave bend away from the axis and toward the retracting tether. The constraint 35 is sufficiently thin to bend at segment between the plates 30, providing a hinged type of movement. Generally, the constraint 35 is adapted to deform or bend along its width. The bending is in response to the tethers in an arcuate manner in a plane perpendicular to the constraint and the plates 20. Lateral movement such as twisting or sideways plate movement is prevented by this hinged structure.

Figure 5A:
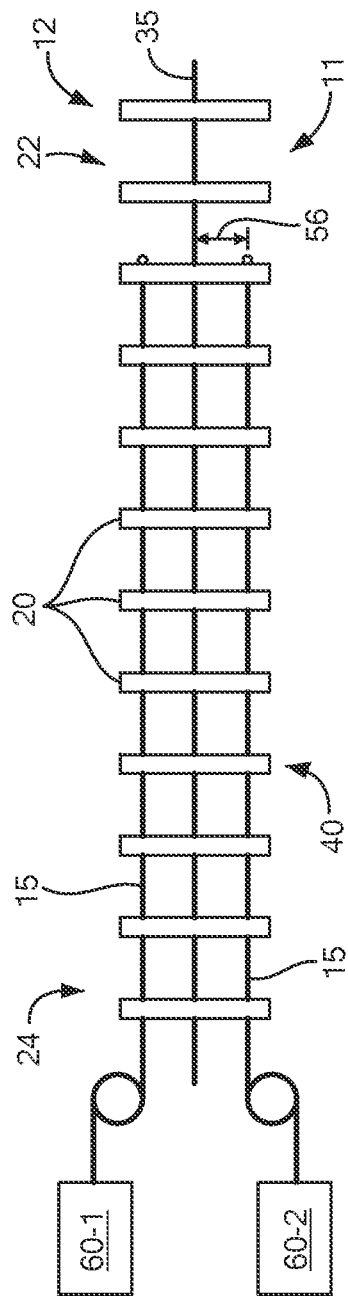
FIGS. 5A and 5B show actuation of the finger members.
Figure 5B:
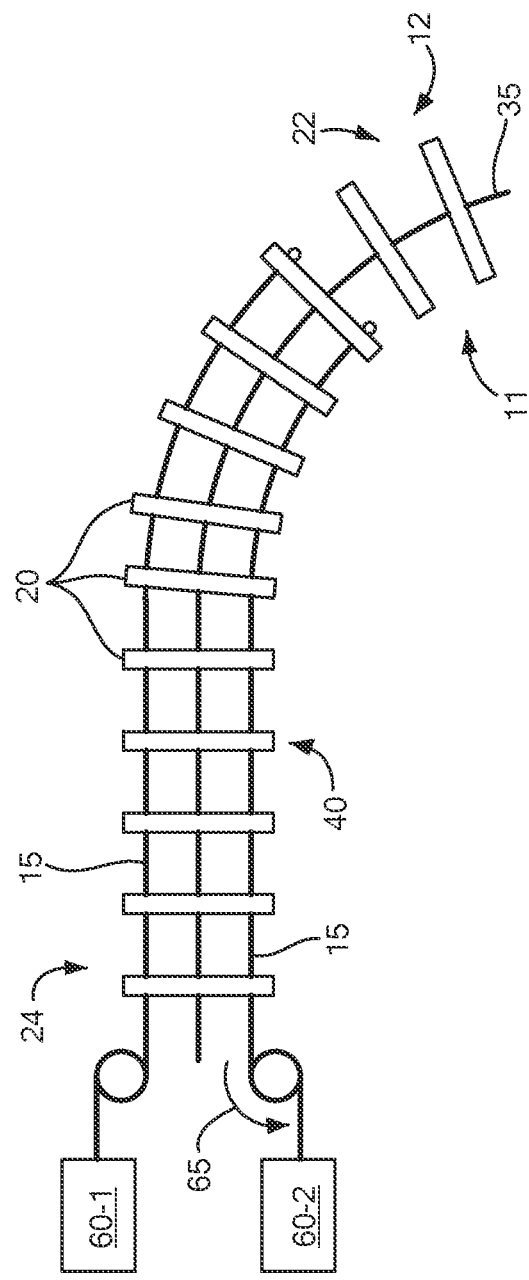

FIGS. 5A and 5B show actuation of the finger members. Referring to FIGS. 1-5B, the body has a plurality of sides 11, 12 (typically 2), and the protrusions 20 extend from at least one of the sides. Each side has a corresponding tether 15 or cable, which is secured at the distal end 22 for disposing adjacent protrusions 20 in closer proximity for providing a curved response in the body 10 toward the actuated side. FIG. 5A shows the finger member 50 prior to actuation and in a straightened position. Actuators 60-1 and 60-2 (60 generally) connect to each tether 15 for retraction. Any suitable actuation may be employed, such as electric, magnetic, pneumatic or hydraulic, using various gearing and/or pulleys, shown below. Each actuated tether 15 is adjacent the elongated body and attached to the distal end 22. The tethers 15 are responsive to retraction for disposing the distal end 22 out of axial alignment, hence curving from the straight position, based on compression along a respective side 11, 12 of the body. Gripping actuation of the finger member 50 therefore results from disposing the distal end 22 out of axial alignment from the rest position based on compression along a side of the body. In FIG. 5B, actuator 60-2 retracts as shown by arrow 65, compressing side 11 by drawing the plates closer. The tether 15 is attached to the third plate 20 from the distal end 22. This provides a buffered or trailing region in the last two protrusions for a greater gripping area. The planar constraint 35 imposes resistance to lateral or twisting movement of the body 10 away from the direction of the compressed side 11, to focus the compressive forces to follow the tether 15.

Figure 6:
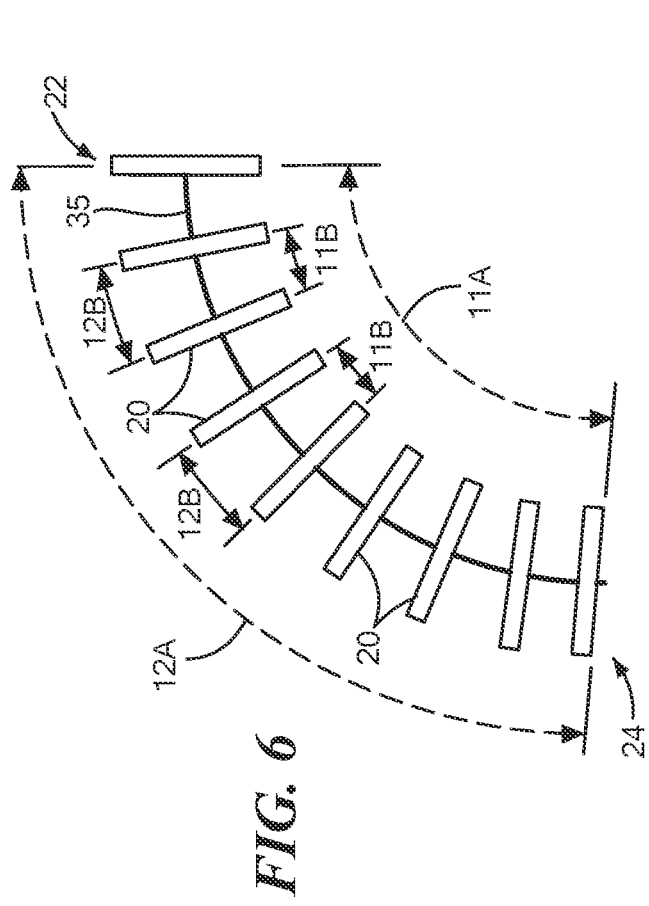
FIG. 6 shows a schematic view of dimensions in an actuated finger member.

FIG. 6 shows a schematic view of dimensions in an actuated finger member. Reiterating from above, the tethers 15, when actuated, reduce a distance from the proximate end 24 to the distal end 22, as the elongated body 10 deforms for accommodating the reduced distance. Referring to FIGS. 5A, 5B and 6, the distance from the proximate end 24 to the distal end is shown on side 11 by dotted line 11A, and on side 12 by dotted line 12A. The distance between the plates 30 on the retracting side 11 is shown as 11B, which is less then the distance between the plates 20 on side 12, shown as 12B.

Figure 7:
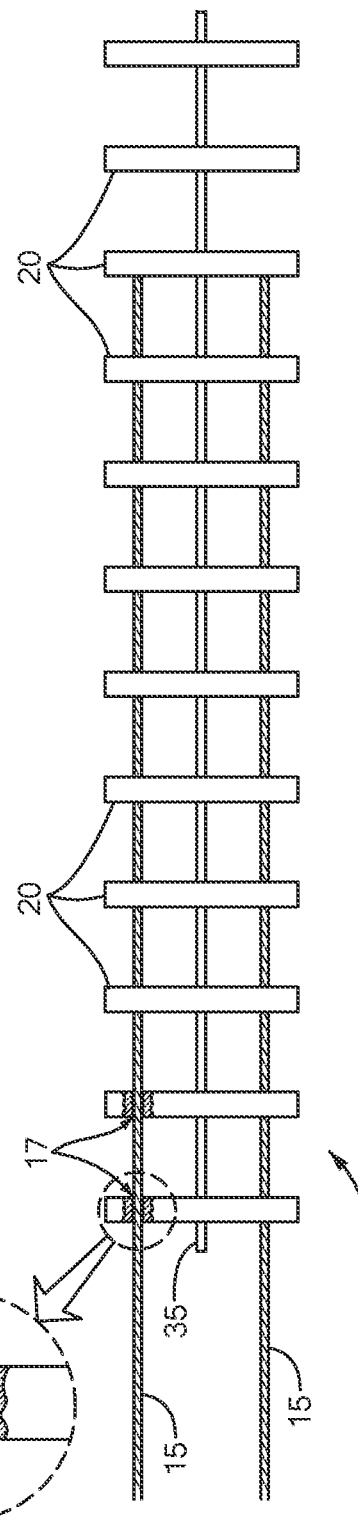
FIG. 7 shows the frame prior to body fabrication of the resilient medium.

FIG. 7 shows the frame prior to body fabrication of the resilient medium. Prior to encapsulating or integrating the frame 40 in the resilient medium, the plates 20, constraint 35 and tethers 15 are cast or formed, typically in a mold for forming the plates. A planar strip such as PET may be fabricated or simply cut from stock material and inserted for the constraint 35, as are the tethers 15, which follow apertures 17 in the plates 20. The plates 20 each include an aperture 17 on the plate 17, such that the tether passes through the aperture for maintaining alignment of the compressed protrusions 30.

Figure 8A:
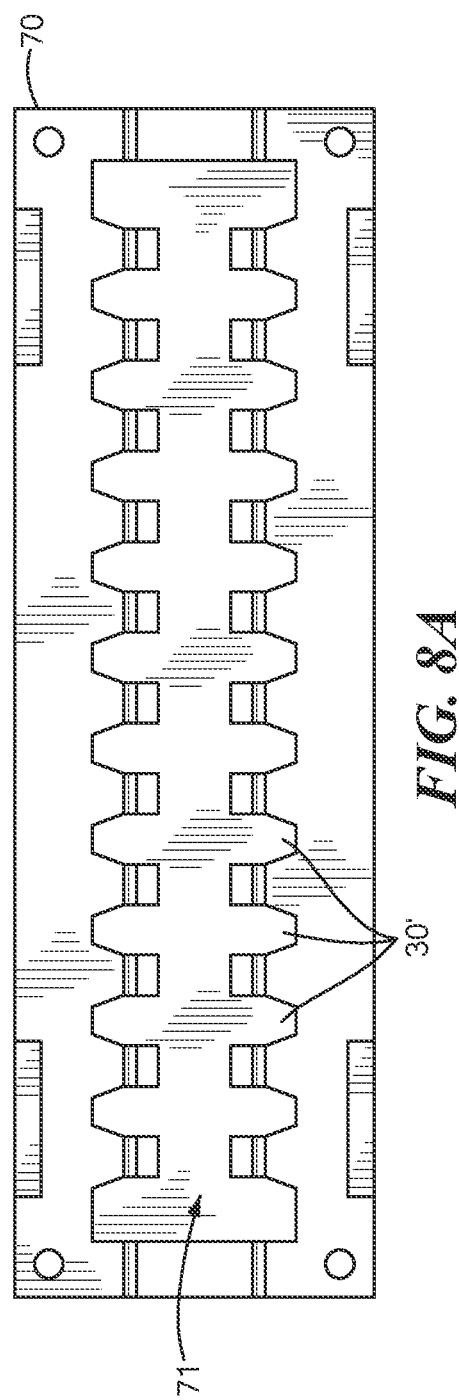
FIGS. 8A and 8B show mold halves for fabricating the resilient medium around the frame of FIG. 7.
Figure 8B:
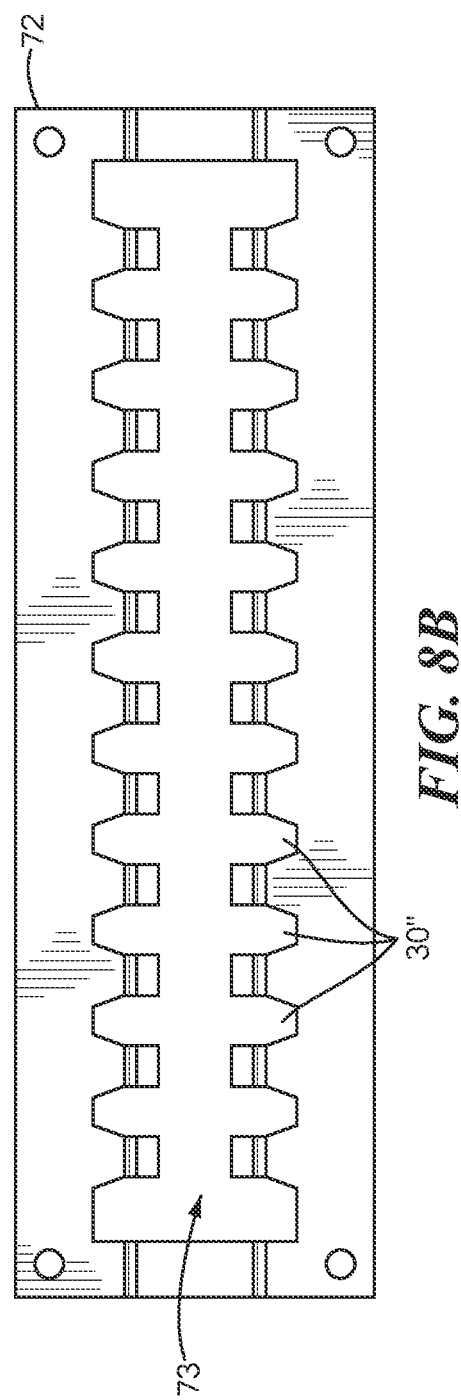

FIGS. 8A and 8B show mold halves for fabricating the resilient medium around the frame of FIG. 7. Referring to FIGS. 7, 8A and 8B, a bottom mold 70 has a bottom void 71 with recessions 30' corresponding to the plates 20. The top mold 72 has a corresponding void 73 with recessions 30" which align with the bottom recession 30' to define a receptacle for the plates 20 to form the protrusions 30.

Figure 9:
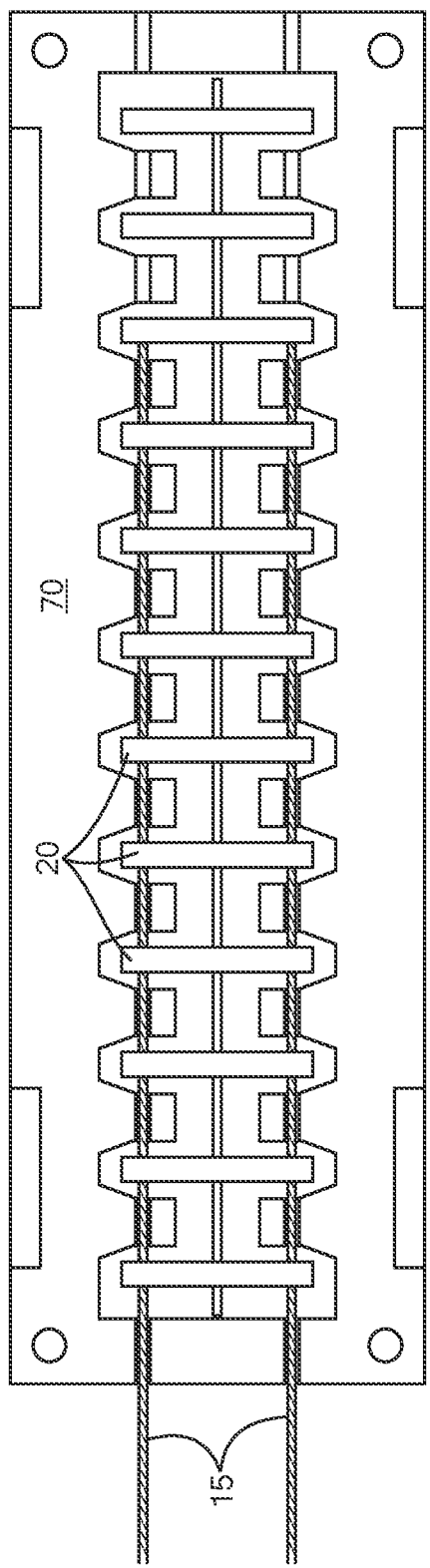
FIG. 9 shows the frame of FIG. 7 inserted in the mold of FIG. 8A.
Figure 10:
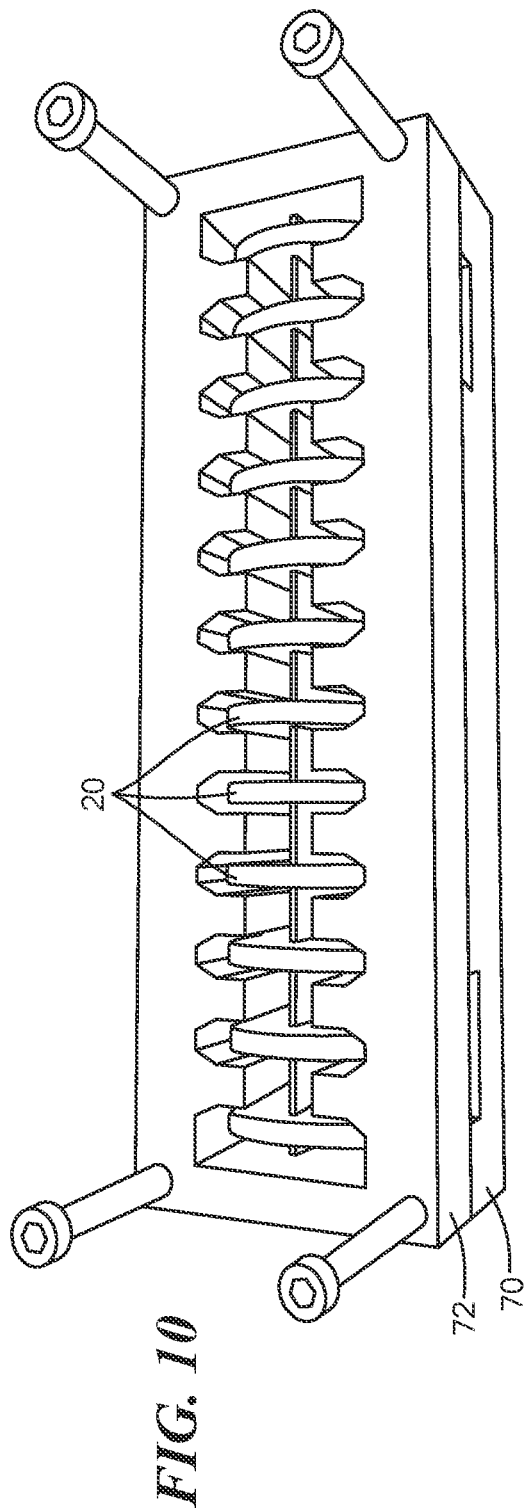
FIG. 10 shows the top half of FIG. 8B on the mold of FIG. 9.

FIG. 9 shows the frame of FIG. 7 inserted in the mold of FIG. 8A, prior to placement of top mold 72 and showing placement for a rigid plate 20 embedded in each of the protrusions 30. In the example arrangement, the body 10 and protrusions 30 are formed from a homogenous molding of the deformable material. FIG. 10 shows the top half of FIG. 8B on the mold of FIG. 9, ready to receive a fluid form of the resilient, deformable material cast as a single integrated molding.

Figure 11:
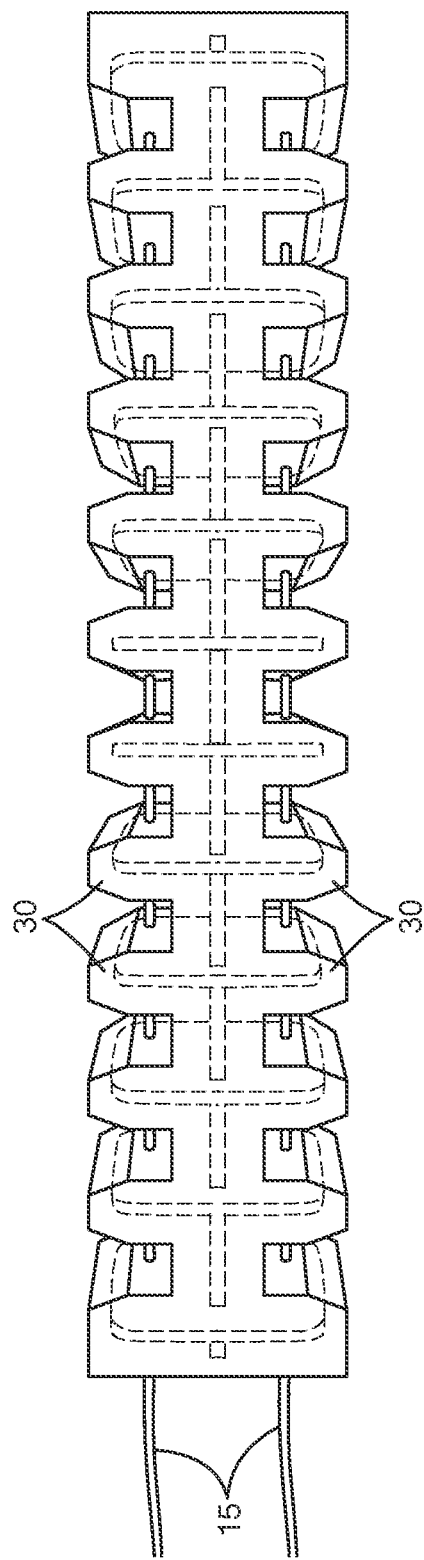
FIG. 11 shows the finger member after mold release.

FIG. 11 shows the finger member after mold release, illustrating the protrusions 30 encapsulating the plates 20 and tethers 15 molded in place.

Figure 12:
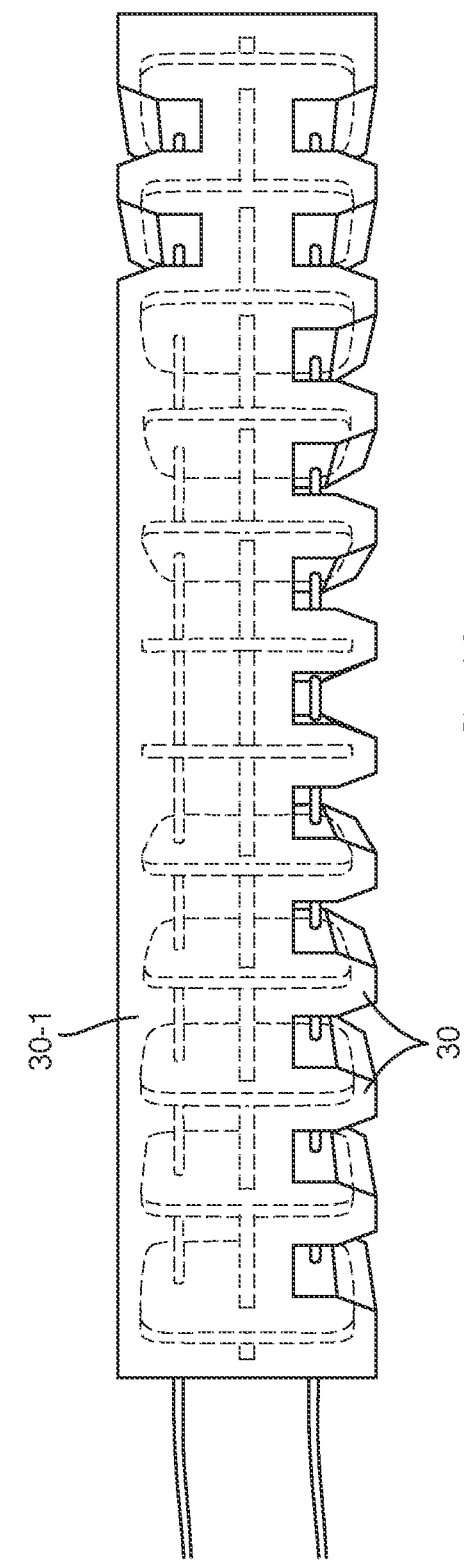
FIG. 12 shows an alternate configuration of the finger member.

FIG. 12 shows an alternate configuration of the finger member 50. Referring to FIGS. 5A, 5B and 12, symmetric sides 11, 12 yield a finger member 50 having equal resistance along either side 11, 12. The sides 11, 12 may also have unequal compression resistance by altering the size and deformable material defining the molded protrusions 30. A common protrusion 30-1 mitigates the gap between the protrusion on one side.

Figure 13:
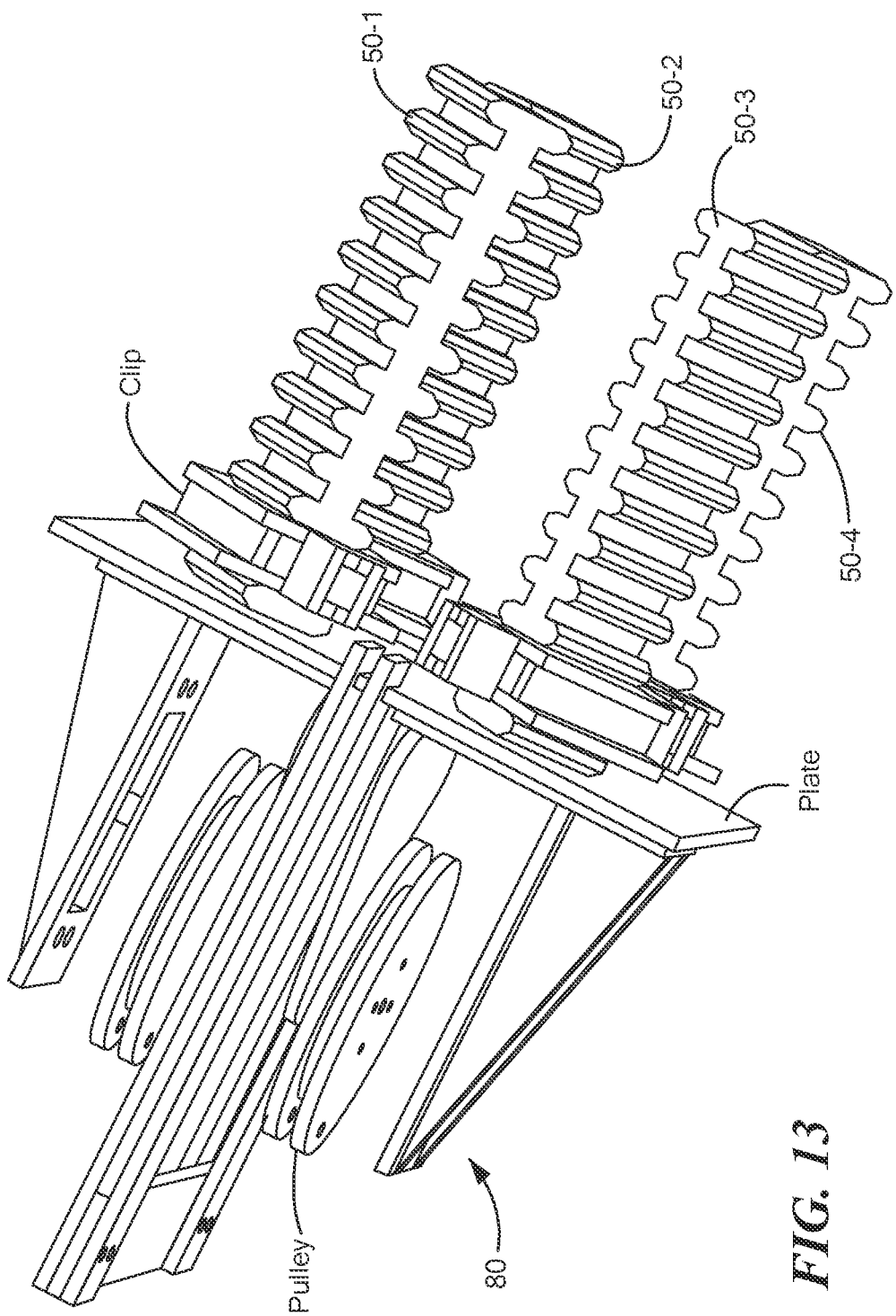
FIG. 13 shows an assembly of a plurality of finger members.

FIG. 13 shows an assembly of a plurality of finger members. Referring to FIGS. 13, each of the finger members 50 is adapted to be operated in conjunction for converging on a common object. A robotic apparatus 80 may include plurality of members arranged in a geometric shape, such that each member 50 is defined by an elongated body 10 and operable to converge towards a common point.

Figure 14:
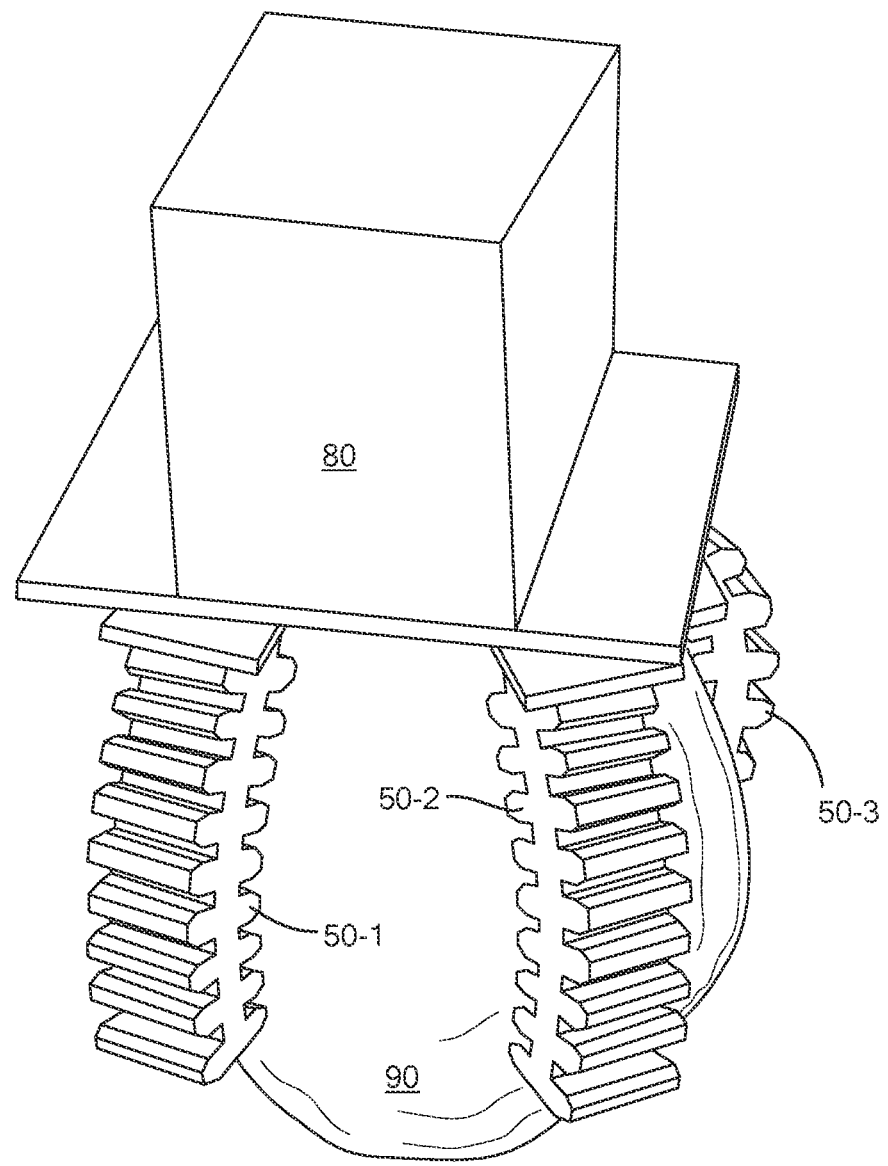
FIG. 14 shows the finger members of FIG. 13 grabbing an object.

FIG. 14 shows the finger members of FIG. 13 grabbing an object. The members 50-1 . . . 50-4 exhibit a retracted side in soft gripping of a common object 90.

A two phase molding process forms the plates 20 first, and then forms the resilient material around the plates to embed them with a degree of movement from the deformable nature of the rubber molding material and the hinged structure as it encapsulates the plates 20 and the tethers 15. Other suitable materials may be employed for the resilient material and the plates; the approach disclosed below is an illustrative example.

Phase 1

1—Put the plastic (material: PET) film in the middle of a two-piece silicone rubber mold.
2—Cast liquid plastic (e.g. polyurethane plastic, other kinds may be used to provide the necessary rigidity for the ribs).
3—Take the rib rack out of the mold when cured (~30 minutes).

Phase 2

1—Run 2 17-inch cables for tethers 15 (could be nylon, monofilament, metal, as long as it has the correct strength and resistance to wear) through the guides on either side of the ribs and tie the ends to the 3rd rib (it could be attached to any rib along the length of the finger member, however advantages disclosed above are realized using the 3rd rib from the tip)

2—Run 2 metal rods through the cable guides for the entire length of the rib rack so that the rods extend ~2 inches on either end of the rib rack 3—Place the rib rack assembly on the bottom part of a 3D-printed 2-piece plastic mold (material: printed PLA (Polylactic Acid) or any other suitable plastic) in such a way that the metal rods rest on the sides of the mold and the plastic ribs are suspended in the cavity of the mold. Place the top part of the mold.

4—Cast liquid silicone rubber through the opening on top of the mold.

5—Demold the cured silicone rubber fingers with internal ribs and plastic constraint layer embedded inside (~30-minutes to 6-hours, depending on the rubber formulation used. The mold may be placed in a warm oven at up to ~60-degree Celsius to speed up the curing if desired.)

Figure 15B:
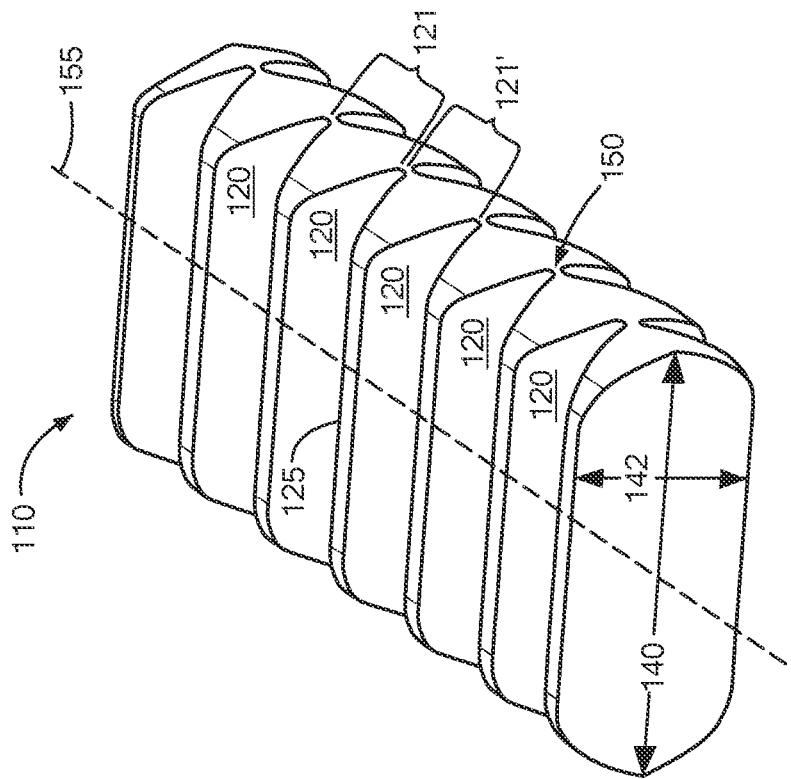
FIGS. 15A and 15B show an alternate configuration with protrusions defined by a shape meeting adjacent protrusion at a point to form a hinge.
Figure 15A:
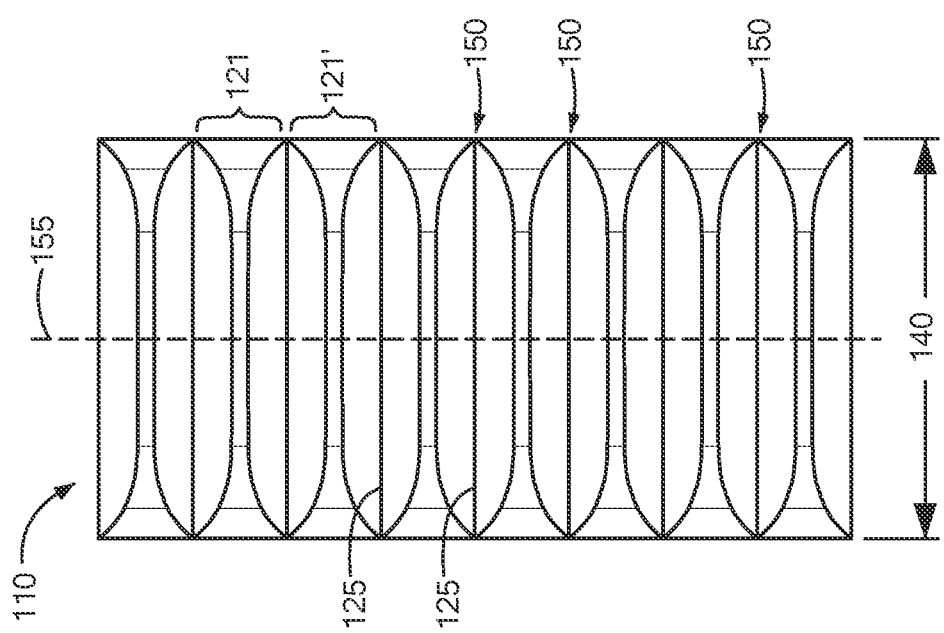

FIGS. 15A and 15B show an alternate configuration with protrusions defined by a shape meeting an adjacent protrusion at a point to form a hinge. Referring to FIGS. 15A and 15B, and continuing to refer to FIG. 1, the protrusions 120 are formed from diamond shaped linkages 121 that meet at a point to define a hinge 150 with an adjacent linkage 121'. Any suitable shape that defines a point to form the hinge 150 with the adjacent linkage may be employed, such as polygonal, circular or elliptical linkages. The hinged approach provides a further resistance to tortional or twisting effect based on the length of the hinge 150, discussed further below.

In FIGS. 15A and 15B, the hinged shape configuration of the robotic member device includes an elongated body 110 defining an axis 155 at a neutral or unactuated position. As discussed above, the body 110 is formed from a resilient medium and has a proximate end 24 and a distal end 22. A plurality of the protrusions 120 on the body 110 are formed from a shape having a continuous edge, such as a diamond, for forming a hinge 150 with each adjacent protrusion, thus forming a series of linkages 121, 121' along the length of the elongated body 110. The protrusions 120 each extend from the axis 155, and each protrusion 120 is joined to an adjacent protrusion by a respective hinge 150. An actuated tether 115 runs adjacent a center of the elongated body 110 and attaches to the distal end at an offset from the axis 115, typically through holes or apertures aligned in the protrusions. The tether 115 is responsive to retraction for disposing the distal end out of axial alignment from the defined axis, as now shown below in FIGS. 16A and 16B.

A deformable material forms each of the protrusions, such that the protrusions 120 have a shape defining a point 125 or ridge, and each of the adjacent protrusions 120 meet at a respective point 125 to define the hinge 150. Each of the protrusions 120 extend along a minor axis 142 and a major axis 140, and the protrusion 120 is elongated in a direction of the major axis 140 for increased stability. The major 140 and minor axis 142 both run perpendicular to the axis 155 of the body, and the major axis 140 and minor axis 142 run perpendicular to each other. The length of the hinge is defined by the major axis 140, as the hinge 150 absorbs torsional force resulting from tether actuation for redirection along the fold of the hinge.

Figure 16A:
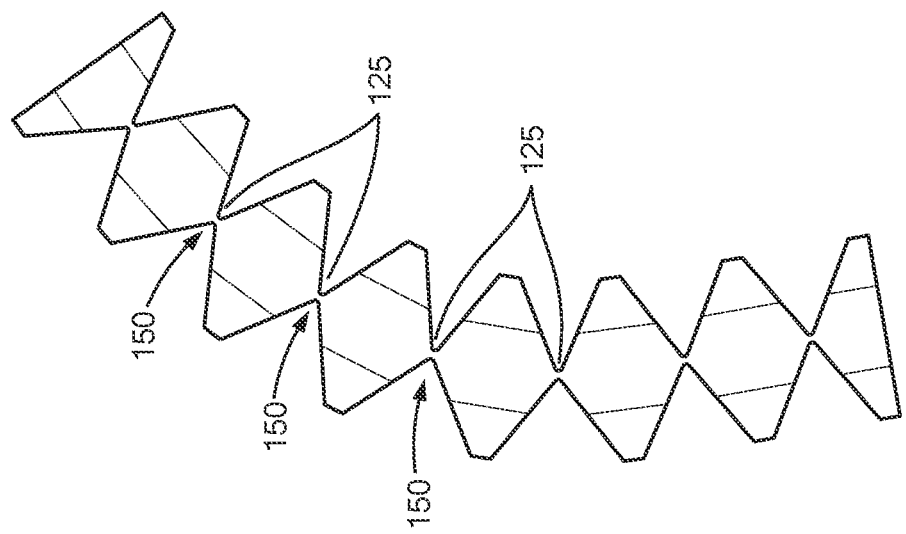
FIGS. 16A and 16B show articulation of the protrusions of FIGS. 15A and 15B.
Figure 16B:
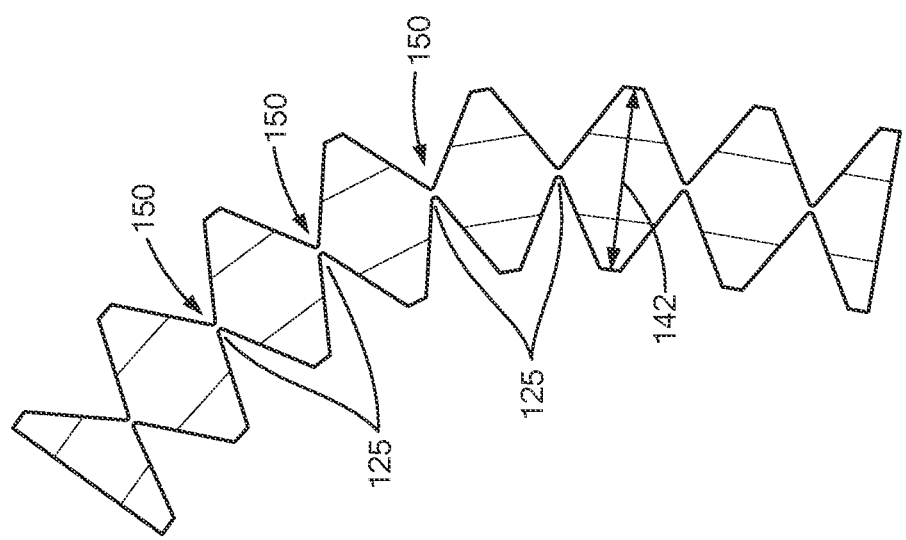

FIGS. 16A and 16B show articulation of the protrusions of FIGS. 15A and 15B. Referring to FIGS. 15A-16B, the hinge is configured to dispose one of the protrusions of the plurality of protrusions at an angle relative to the adjacent protrusion by folding at the hinge joining the respective protrusions. Each hinge 150 is adapted to fold along the major axis 140 of the respective linkage 121.

Figure 17:
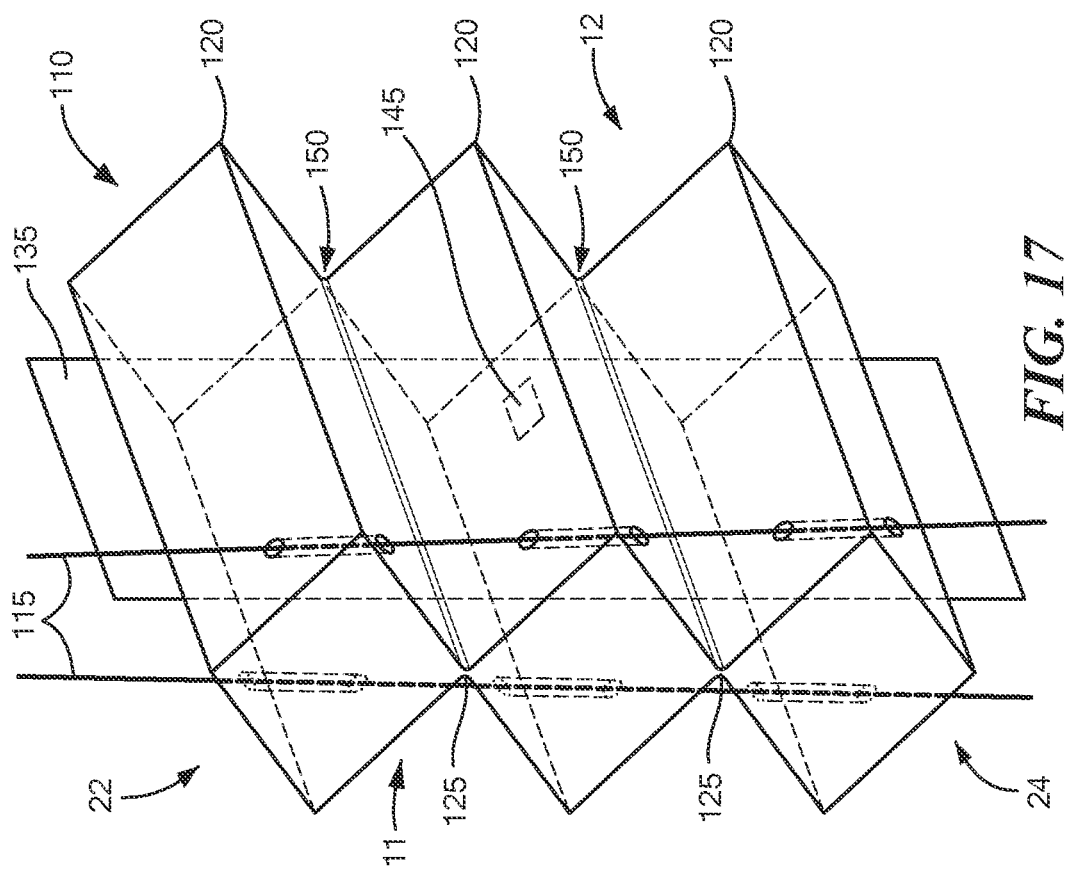
FIG. 17 shows a perspective view of the finger member of FIGS. 15A and 15B having the hinged protrusions.

FIG. 17 shows a perspective view of the finger member of FIGS. 15A and 15B having the hinged protrusions. Referring to FIG. 17, and continuing to refer to FIGS. 15A-16B, the body 110 may include an embedded planar constraint 135, such that the planar constraint 135 defines the axis 155 of the elongated body 110 at a rest position, and is deformable in response to tether 115 actuation. It can be observed that the hinge 150 folds along an axis parallel to the width of the planar constraint 135 embedded in the resilient material of the elongated body 110. The control tethers 115 are located substantially off-center of the major axis, and are disposed more distal along the major axis than the extension along the minor axis; in other words, more off-center that the length of the minor axis. This allows the additional rigidity afforded by the hinge to be leveraged for locating the tether along one side of the elongated body, which facilitates actuator placement in an array of 2 or 4 robotic members, as in FIG. 13.

The diamond profile of each linkage illustrates how the hinge 150 is based on a sequence of shapes 125 meeting at a point. Each of the protrusions 120 defines a shape having a point 125 meeting a point of an adjacent shape, such that the points 125 define the hinge 150 based on a seam of deformable material joining the protrusions, or linkages 121, 121'.

Further configurations employ a force gauge 145 affixed to the planar constraint 135, such that the force gauge 145 is responsive to flexure of the planar constraint 135 in response to movement away from the axis of the elongated body, as in FIGS. 16A and 16B. The force gauge 145 may be a strain gauge configured to deliver a voltage signal based on surface aberrations from curvature away from the axis of the elongated body, as the planar constraint bends in response to actuation of the tethers 115.

Other configurations may also include a plurality of tethers on the opposed sides 11, 12 of the elongated body, the plurality of tethers joined to form a single actuated tether, or web, for drawing the actuation at multiple positions on the protrusion 120 from a single actuator, drawn through multiple apertures or channels on the same protrusion for enhancing gripping force on the particular side.

Figure 18:
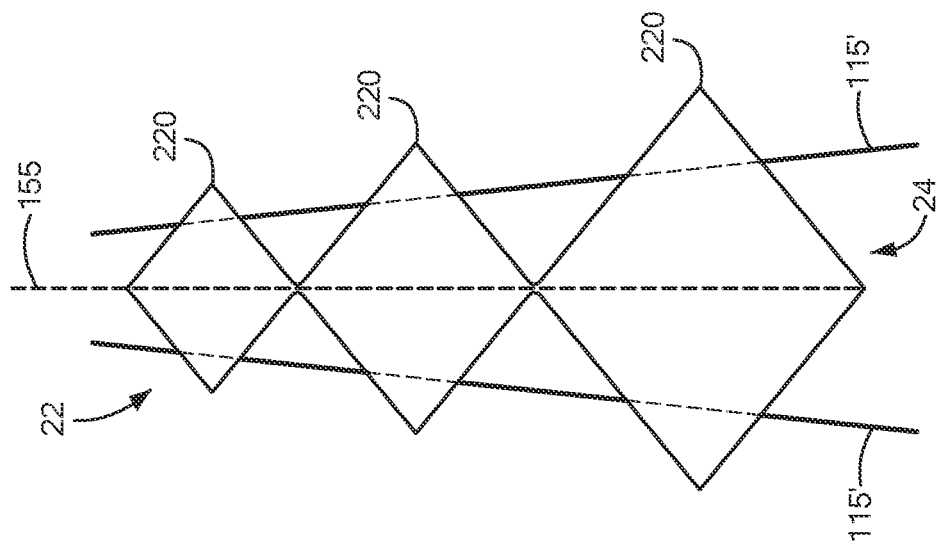
FIG. 18 shows a stepped configuration with increasing protrusion sizes towards the proximate end.

FIG. 18 shows a further enhancement including a stepped configuration with increasing protrusion 220 sizes towards the proximate end 24. FIG. 18 shows protrusions 220 of a graduated size, such that the graduated size decreasing towards the distal end 22. This allows the actuated tether 115' to approach the distal end 22 at an acute angle 160 from the axis 155 of the elongated body 110, as an alternative to a parallel approach.

Figure 19A:
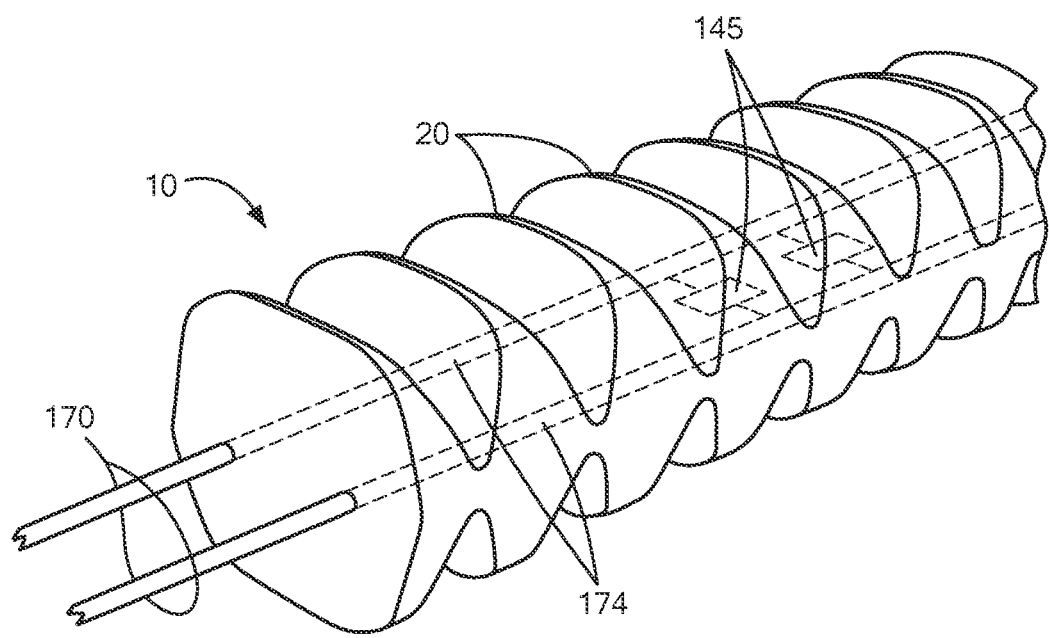
FIGS. 19A and 19B show electrical connections for the force gauge of FIG. 17.
Figure 19B:
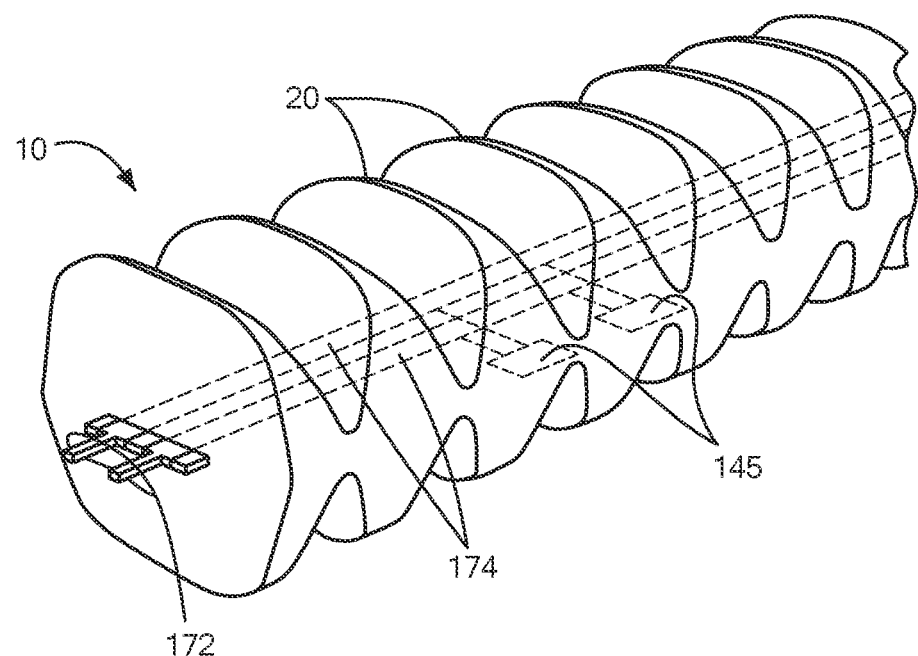

FIGS. 19A and 19B show electrical connections for the force gauge of FIG. 17. Referring to FIGS. 1, 17 and 19A-19B, one or more force gauges 145 connect to electrical traces 174 extending through the body, such as by attachment to the constraint 35, 135. The traces connect to control wires 170 or tabs 172 for transferring a force or strain signal to a control circuit. Typically a low voltage DC signal, such as 5 or 12 volts would be expected. In alternate configurations, however, AC circuits for use with a piezoelectric or other sensor may provide frequency based signals.

Figure 20:
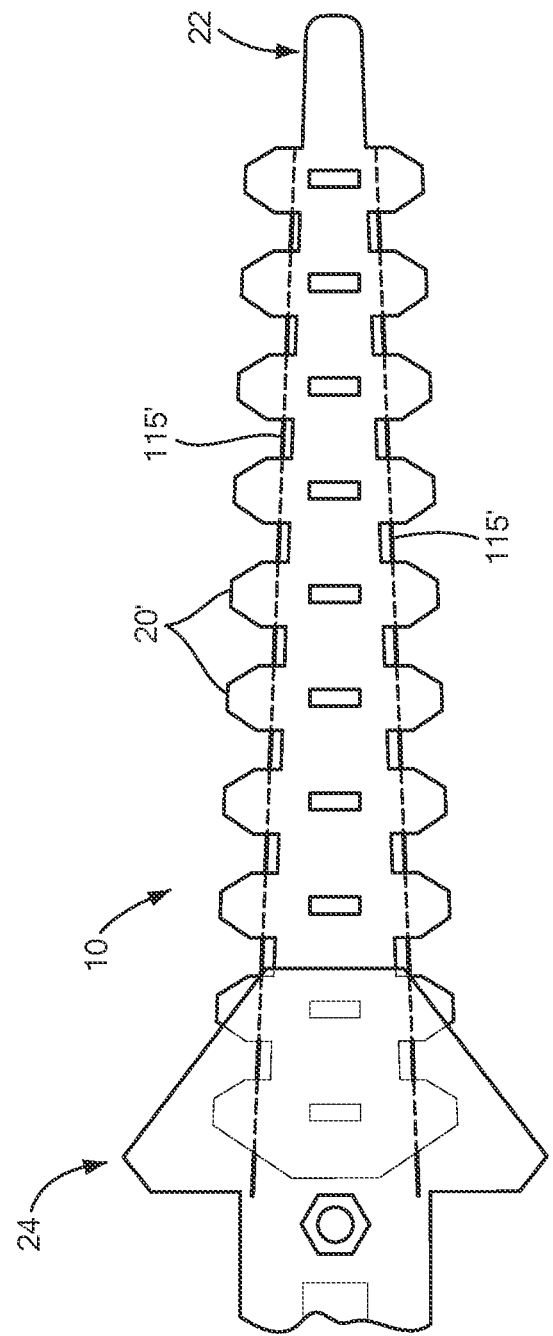
FIG. 20 shows angled tethers with similar sized protrusions as in FIG. 1.

FIG. 20 shows angled tethers with similar sized protrusions as in FIG. 1. As in FIG. 18, the control tethers 15 approach the distal end 22 at a narrow angle, however the protrusions 20 are generally similarly sized.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A robotic member device, comprising:
an elongated body defining an axis, the body formed from a continuous, homogenous resilient medium and having a proximate end and a distal end;
a plurality of protrusions on the body, the protrusions extending from the axis, each protrusion joined to an adjacent protrusion by a respective hinge, each hinge perpendicular to the axis and parallel to the other hinges; and
an actuated tether adjacent the elongated body and attached to the distal end at an offset from the axis,
the tether extending parallel to the axis responsive to retraction for disposing the distal end out of axial alignment from the defined axis.

2. The device of claim 1 wherein the hinge is configured to dispose one of the protrusions of the plurality of protrusions at an angle relative to the adjacent protrusion by folding at the hinge joining the respective protrusions.

3. The device of claim 1 wherein each of the protrusions extend along a minor axis and a major axis, the protrusion elongated in a direction of the major axis, the major and minor axis perpendicular to the axis of the body, the major axis perpendicular to the minor axis.

4. The device of claim 3 wherein the hinge is adapted to fold along the major axis.

5. The device of claim 3 wherein the tether is disposed more distal along the major axis than the extension along the minor axis.

6. The device of claim 5 wherein the hinge absorbs torsional force resulting from tether actuation for redirection along the fold of the hinge.

7. The device of claim 1 further comprising a plurality of tethers on opposed sides of the elongated body, the plurality of tethers joined to form a single actuated tether.

8. The device of claim 1 further comprising a deformable material forming the protrusions, the protrusions having a shape defining a point, each of the adjacent protrusions meeting at the point to define the hinge.

9. The device of claim 8 wherein the hinge folds along an axis parallel to a planar constraint defining the axis of the elongated body.

10. The device of claim 1 wherein the body includes an embedded planar constraint, the planar constraint defining the axis of the elongated body, the planar constraint deformable in response to tether actuation.

11. The device of claim 1 wherein the each of the protrusions defines a shape having a point meeting a point of an adjacent shape, the points defining the hinge based on a seam of deformable material joining the protrusions.

12. The device of claim 1 further comprising a force gauge affixed to the planar constraint, the force gauge responsive to flexure of the planar constraint in response to movement away from the axis of the elongated body.

13. The device of claim 12 wherein the force gauge is a strain gauge configured to deliver a voltage signal based on surface aberrations from curvature away from the axis of the elongated body.

14. The device of claim 1 wherein the actuated tether approaches the distal end at an acute angle from the axis of the elongated body.

15. The device of claim 1 further comprising protrusions of a graduated size, the graduated size decreasing towards the distal end.

16. The device of claim 1, further comprising a force gauge affixed in the homogeneous body, the force gauge disposed on the axis, the axis running through each of the hinges and responsive to flexure of the planar constraint in response to movement away from the axis of the elongated body.

* * * * *